United States Patent [19]

Buchholz et al.

[11] Patent Number: 5,956,490

[45] Date of Patent: Sep. 21, 1999

[54] METHOD, CLIENT DEVICE, SERVER AND COMPUTER READABLE MEDIUM FOR SPECIFYING AND NEGOTIATING COMPRESSION OF UNIFORM RESOURCE IDENTIFIERS

[75] Inventors: Dale Robert Buchholz, Palatine; James Edward Van Peursem, Hanover Park, both of Ill.

[73] Assignee: Motorola, Inc., Schaumburg, Ill.

[21] Appl. No.: 09/109,229

[22] Filed: Jun. 30, 1998

[51] Int. Cl.[6] .................................................... G06F 15/16
[52] U.S. Cl. ............................... 395/200.75; 395/200.53; 395/200.59; 395/200.77
[58] Field of Search .......................... 395/200.75, 200.53, 395/200.59, 200.77

[56] References Cited

U.S. PATENT DOCUMENTS

| 5,131,016 | 7/1992 | Broughton et al. ....................... 375/122 |
| 5,557,749 | 9/1996 | Norris ................................. 395/200.18 |
| 5,742,773 | 4/1998 | Blomfield-Brown et al. ...... 395/200.58 |
| 5,764,910 | 6/1998 | Shachar ............................... 395/200.53 |

*Primary Examiner*—Robert B. Harrell
*Assistant Examiner*—Saleh Najjar
*Attorney, Agent, or Firm*—Darleen J. Stockley

[57] ABSTRACT

A method (500), client device (700), server (800) and computer readable medium (900) provide a scheme for negotiating compression of universal resource identifiers. The method includes: (1) sending, by a client, a request to a server wherein the request includes an uncompressed universal resource identifier URI and a list of compression techniques of the client; (2) determining, by the server, an intersection of the list of compression techniques of the client and a list of compression techniques of the server and providing a response to the client that includes the intersection and information identified by the URI; (3) subsequently requesting, by the client, information wherein one of: (4) decompressing, by the server, the compressed URI using the compression technique indicated in the subsequent request; and (5) responding, by the server, wherein the response includes information requested as identified by the compressed URI.

17 Claims, 6 Drawing Sheets

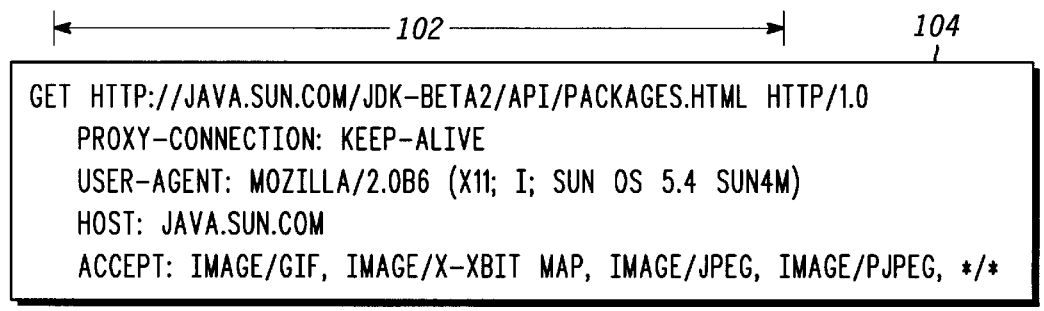
FIG. 1 100
200 FIG. 2
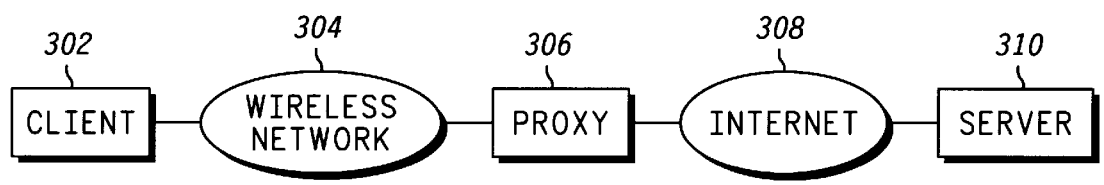
300 FIG. 3

```
---- REQUEST (402) ----
GET HTTP://WWW.OPENMARKET.COM/PRODUCTS/HTTP/1.0
PROXY-CONNECTION: KEEP-ALIVE

.
        .
        .

URI-COMPRESS: 81828586

--- RESPONSE (404) ---
HTTP/1.0 200 OK

.
        .
        .

URI-COMPRESS: 85

--- REQUEST (406) ---
GET 85 <COMPRESSED URI> HTTP/1.0

.
        .
        .

--- RESPONSE (408) ---
HTTP/1.0 200 OK

.
        .
        .

--- REQUEST (410) ---
GET 85 <COMPRESSED URI> HTTP/1.0

.
        .
        .

--- RESPONSE (412) ---
HTTP/1.0 200 OK

COMPUTER READABLE MEDIUM/ARTICLE OF MANUFACTURE

EXECUTABLE PROGRAM INSTRUCTIONS:
(A) SEND A REQUEST TO A SERVER WHEREIN THE REQUEST INCLUDES AN UNCOMPRESSED UNIVERSAL RESOURCE IDENTIFIER URI AND A LIST OF COMPRESSION TECHNIQUES;
(B) SUBSEQUENTLY REQUEST, UPON THE SERVER'S DETERMINING AN INTERSECTION OF THE LIST OF COMPRESSION TECHNIQUES OF THE CLIENT AND A LIST OF COMPRESSION TECHNIQUES OF THE SERVER AND PROVIDING A RESPONSE THAT INCLUDES THE INTERSECTON AND INFORMATION REQUESTED BY THE URI BY THE CLIENT, USING A COMPRESSED URI AND AN INDICATION OF A COMPRESSION TECHNIQUE USED FROM THE INTERSECTION; AND
(C) DISPLAY INFORMATION REQUESTED IDENTIFIED BY THE COMPRESSED URI AND RECEIVED FROM THE SERVER

METHOD, CLIENT DEVICE, SERVER AND COMPUTER READABLE MEDIUM FOR SPECIFYING AND NEGOTIATING COMPRESSION OF UNIFORM RESOURCE IDENTIFIERS

FIELD OF THE INVENTION

The present invention relates to uniform resource identifiers/locators.

BACKGROUND OF THE INVENTION

The World-Wide Web is a popular Internet application for the creation, storage and retrieval of rich multimedia content. Web addresses are used to direct communications on the Internet. A plurality of web browsers are available to access information on the Internet. When requesting a connection to a web address using HyperText Transport Protocol (HTTP), the request includes Uniform Resource Identifiers (URIs) which includes universal resource locators and/or universal resource names, i.e., formatted strings that identify a network resource by name, location or another predetermined characteristic. URIs throughout the rest of the text include universal resource identifiers, universal resource locators and universal resource names.

Internet protocol headers are often lengthy. For example, a HTTP request may consist of over 200 characters. It is clear that, particularly with wireless networking, where capacity is a limited and scarce resource, it would be advantageous to compress at least part of the HTTP request.

Since URIs for many HTTP requests tend to contain large portions of redundant phraseology, there is a need for a method and device for negotiating compression of universal resource identifiers, thus providing more efficient allocation of resource capacity.

BRIEF DESCRIPTION OF THE DRAWINGS

FIG. 1 is a schematic representation of an HTTP message format as is known in the art.

FIG. 2 is a schematic representation of a client-server architecture as is known in the art.

FIG. 3 is a schematic representation of a client-proxy-server architecture as is known in the art.

FIG. 4 is a schematic representation of a message exchange diagram.

FIG. 9 is a block diagram of one embodiment of a computer readable medium for providing a scheme for negotiating compression of universal resource identifiers in accordance with the present invention.

DETAILED DESCRIPTION OF A PREFERRED EMBODIMENT

Figure 5:
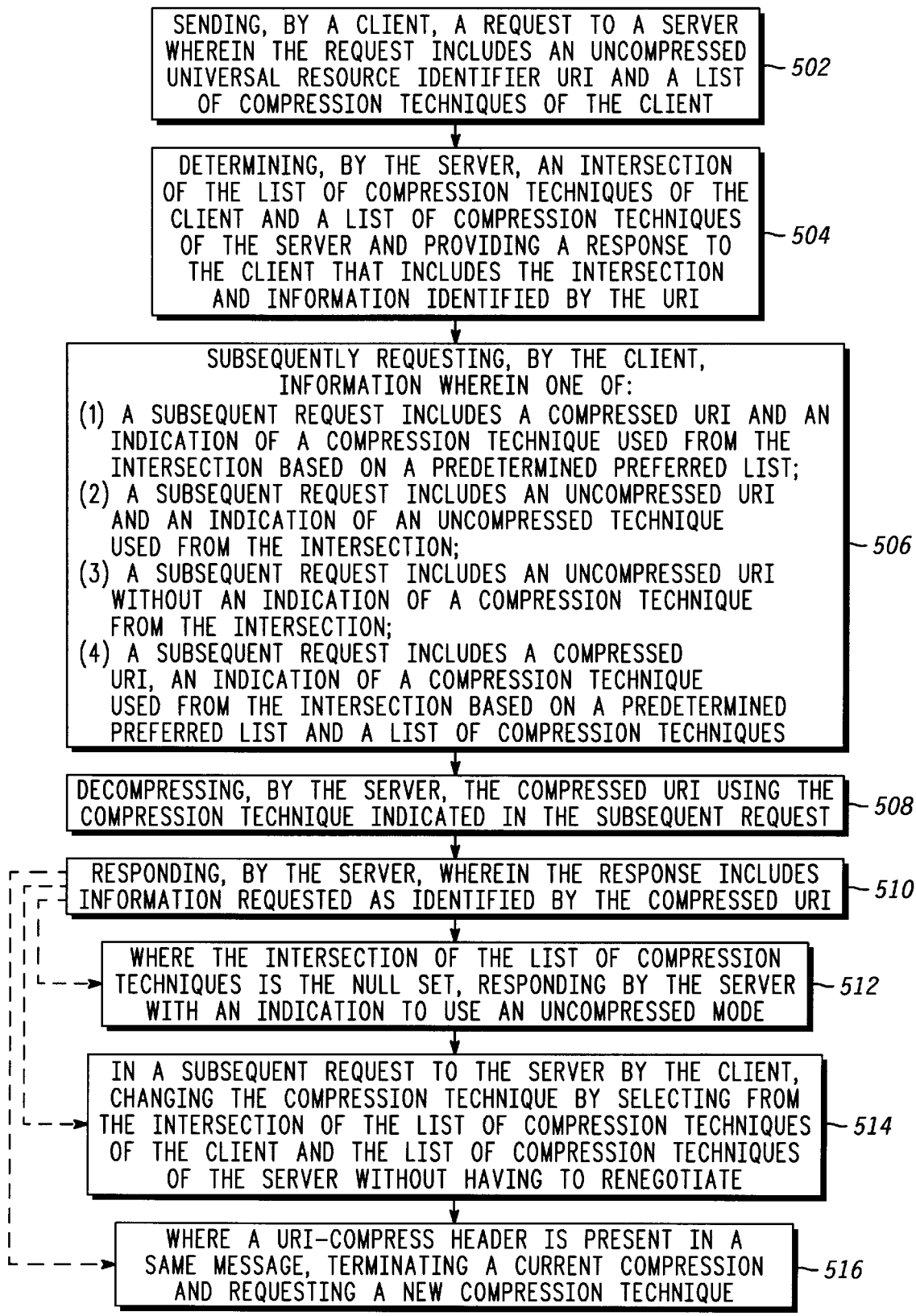
FIG. 5 is a flow chart showing steps of a method in accordance with a client procedure of the present invention.

Web addresses such as URIs are typically used to indicate locations of specific information on the Internet. In HTTP requests, URIs in GET and POST request messages may be relatively long compared to the remaining information in a message.

The compression of URIs in HTTP requests provides throughput benefits by reducing the number of bytes that need to be transmitted. In any network where the uplink is shared and a contention-based access scheme is used to arbitrate transmissions, reducing the transmitted packet size makes it less likely to collide with another transmission. This is true of all variety of wireless networks, including wide-area packet data (e.g., CDPD), two-way paging (e.g., ReFLEX), and wireless LANs (RF and IR), as well as wired networks that provide wide-area data services, such as those emerging in the cable TV industry.

The URI is often a large part of the request. Therefore, compressing the URI may typically reduce the probability for collision in the uplink or may provide better efficiency in bandwidth-constrained uplinks. Since the URIs are encoded in a standard character set using specific language grammar rules, there exists an opportunity to compress a URI into a smaller number of characters by applying off-the-shelf or proprietary compression schemes. It should be appreciated by those skilled in the art that techniques which minimize the amount of information to be transmitted in wireless networks can also be readily applied to wireline networks to reduce transmission capacity requirements.

FIG. 1, numeral 100, shows a schematic representation of an HTTP message format as is known in the art. The format of the HTTP request (104) shows a plurality of lines, each indicating a separate field. The request fields are encoded in 7-bit or 8-bit ASCII. The CR/LF sequence at the end of each line acts as a separator for the different fields. Lateral white-space (LWS), e.g., space and tab, serves to delimit the parameters of a particular line. The length of the request in FIG. 1 is 231 characters.

The URI to be compressed (102) by the present invention is found in the first line between GET and HTTP/1.0, specifically:

http://java.sun.com/JDKbeta2/api/packages.html

The URI to be compressed is referred to as the Request-URI.

Having identified the field to be compressed, it is easy to see that a variety of industry-standard and proprietary compression schemes may be applied to the characters. What is lacking is a method for specifying and negotiating which type of compression is to be used.

In order to compress any field of a message exchanged between two or more network devices, the compression technique has to be agreed upon by all communicating devices. The current invention presents a method for the negotiation of compression between the sending device (client) and the receiving device (server).

The prior art teaches that two architectures are possible with respect to HTTP. The first is a client-server architecture, as shown in FIG. 2, numeral 200, where the client (202) communicates directly with the server (206) via a wireless network (204). In this case, the HTTP request contains only the absolute path name as the Request-URI. Using the above example, the Request-URI for the client-server case is:

/JDK-beta2/api/packages.html

The scheme and host information, i.e., http:// and java.sun.com respectively, are used by the client to establish a network connection to java.sun.com.

The second case is the client-proxy-server architecture, as shown in FIG. 3, numeral 300. In this case, the Request-URI is an absolute URI, i.e., it contains the scheme, host, and absolute path name. The client (302) establishes a network connection with a proxy (306) via a wireless network (304) which then establishes a network connection with the appropriate web server (310) via the Internet (308). The proxy is generally used to provide security firewall services, but can be used for other services, such as compression and caching.

The method for specifying and negotiating compression between the client and server or proxy is fairly simple. In the prior art the Request-URI is delimited by SP (space) after GET and before HTTP/1.0 in the HTTP/1.0 protocol, or by SP and CR-LF in HTTP/0.9 (for backward compatibility). In the case of client-server, the Request-URI must begin with a "/" and end with either SP or CR-LF. In the case of client-proxy, the Request-URI must begin with a valid scheme label. Scheme labels can only begin with one of (ALPHA | DIGIT | "+" | "–" | "."), where ALPHA is the upper and lower case A–Z and DIGIT is the numbers 0–9. All these characters are represented in 7-bit ASCII, i.e., the most significant bit is set to zero.

The present invention takes advantage of this fact and inserts a byte with the most significant bit set to one to denote a compression indicator. The remaining 7 bits of this indicator are used to denote the compression method by mapping the method to a binary number in the range 1–127. The pattern of all zeroes in the seven bits denotes a desire to do compression, but the current Request-URI is uncompressed. For example, compression may be implemented as shown in Table 1:

TABLE 1

| | |
|---|---|
| 10000000 | uncompressed |
| 10000001 | type A |
| 10000010 | type B |
| 10000011 | type C |
| 10000100 | type D |
| 10000101 | type E |

There are several ways in which the client and server (or proxy) can negotiate the type of compression to be used. Assuming that the client and server (or proxy) have identical tables mapping compression indicators to compression strings, then the client can identify which compression technique(s) it wishes to use by communicating the set of available techniques in an URI-compress: header in the HTTP message. This would be a new header type understood only by servers (proxies) that support compression. Others would ignore this field. An example is:

URI-compress: 818285, where each number-pair is the hexadecimal representation of the byte for the compression indicator. For example, 81 would specify type A from the above table, 82 represents type B coding, etc.

The server (or proxy) then responds with a choice from the list provided by the client. For example:

URI-compress: 85, designating type E from the above table of compression techniques.

The exchange set forth in FIG. 4, numeral 400, is an example of how a compression technique is established using the values from the compression table above. The bold type indicates the changes as a result of the negotiation protocol. In the first request (402), the list of compression techniques available at the client is submitted to the proxy via the URI-compress: header. In the response (404), the proxy indicates its choice via the URI-compress: header. In the next request (406), the Request-URI is compressed using the scheme designated by 85. Notice the absence of the URI-compress: header. The subsequent response (408) is just a normal HTTP response. The next request (410) contains another compressed Request-URI. The subsequent response (412) is a normal HTTP response.

FIG. 5, numeral 500, is a flow chart showing steps of a method in accordance with a client procedure of the present invention. The method provides for negotiating the compression technique of universal resource identifiers and includes the steps of: (A) sending (502), by a client, a request to a server wherein the request includes an uncompressed universal resource identifier URI and a list of compression techniques of the client; (B) determining (504), by the server, an intersection of the list of compression techniques of the client and a list of compression techniques of the server and providing a response to the client that includes the intersection of the compression techniques and information identified by the URI; (C) subsequently requesting (506), by the client, information wherein one of: (C1) a subsequent request includes a compressed URI and an indication of a compression technique used from the intersection based on a predetermined preferred list; (C2) a subsequent request includes an uncompressed URI and an indication of an uncompressed technique used from the intersection; (C3) a subsequent request includes an uncompressed URI without an indication of a compression technique from the intersection; (C4) a subsequent request includes a compressed URI, an indication of a compression technique used from the intersection based on the predetermined preferred list and a list of compression techniques; (D) decompressing (508), by the server, the compressed URI using the compression technique indicated in the subsequent request; and E) responding (510), by the server, wherein the response includes information requested as identified by the compressed URI.

Where selected, the method may further include the step of, where the intersection of the list of compression techniques is the null set, responding (512) by the server with an indication to use an uncompressed mode. Also, where selected, after step E, the method may include, in a subsequent request to the server by the client, changing (514) the compression technique by selecting from the intersection of the list of compression techniques of the client and the list of compression techniques of the server without having to renegotiate.

Additionally, where a URI-compress header is present in a same message, a current compression may be terminated and a new compression technique may be requested (516).

Figure 6:
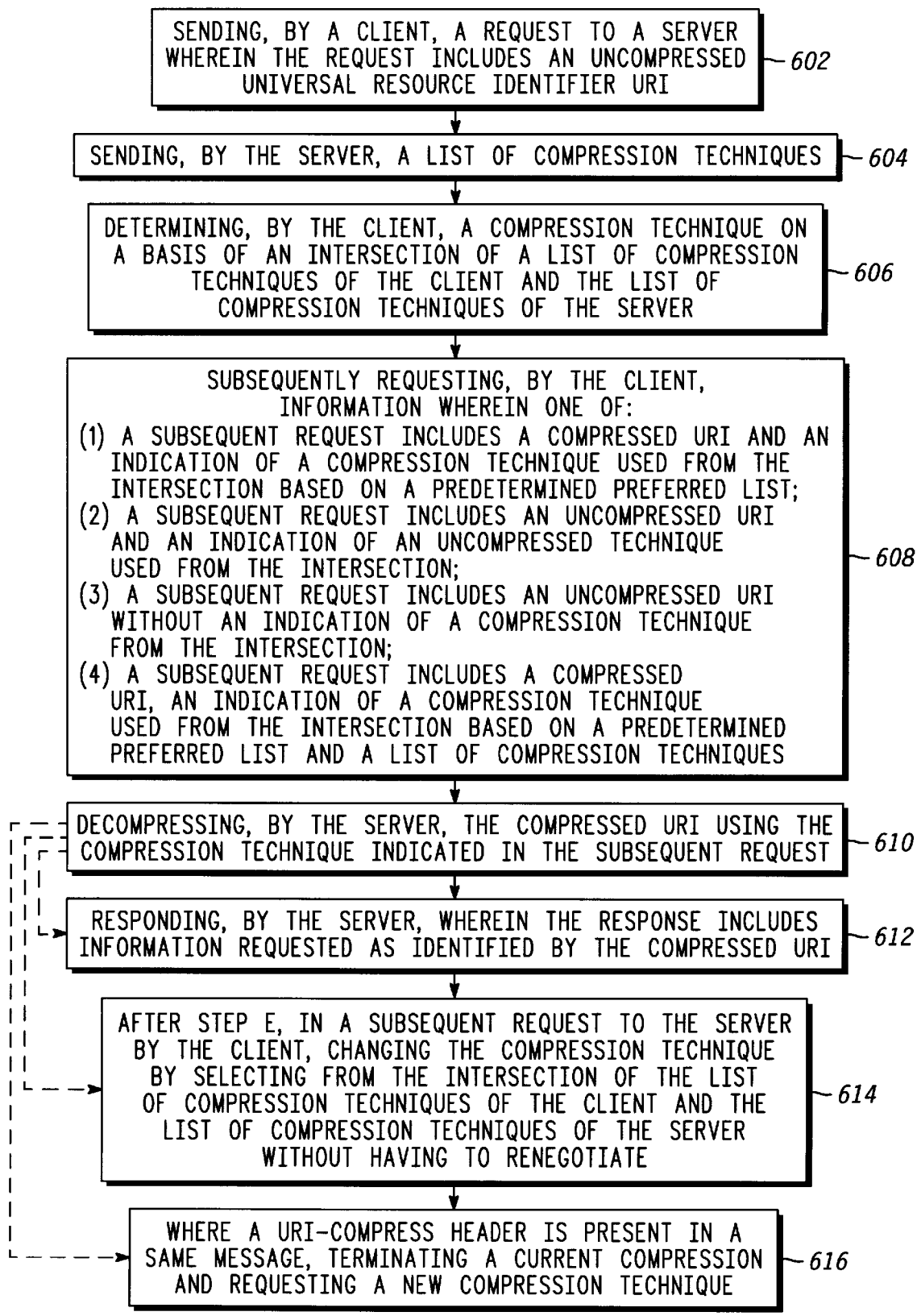
FIG. 6 is a flow chart showing steps of a method in accordance with a server procedure of the present invention.

FIG. 6, numeral 600, is a flow chart showing steps of the method in accordance with a server procedure of the present invention. The method provides for negotiating compression of universal resource identifiers and includes the steps of: (A) receiving (602) from a client, a request to a server wherein the request includes an uncompressed universal resource identifier URI; (B) sending (604), by the server, a list of compression techniques; (C) determining (606), by the client, a compression technique on a basis of an intersection of a list of compression techniques of the client and the list of compression techniques of the server; (D) subsequently receiving (608) from the client, information wherein one of: (D1) a subsequent request includes a compressed URI and an indication of a compression technique used from the intersection of the list of compression techniques of the client and the list of compression techniques of the server based on a predetermined preferred list; (D2) a subsequent request includes an uncompressed URI and an indication of an uncompressed technique used from the intersection; (D3) a subsequent request includes an uncompressed URI without an indication of a compression technique from the intersection; (D4) a subsequent request includes a compressed URI, an indication of a compression technique used from the intersection based on a predetermined preferred list and a list of compression techniques; (E) decompressing (610), by the server, the compressed URI using the compression technique indicated in the subsequent request; and (F) responding (612), by the server, wherein the response includes information requested as identified by the compressed URI.

Where selected, after step E, the method may further include, in a subsequent request to the server by the client, changing (614) the compression technique by selecting from the intersection of the list of compression techniques of the client and the list of compression techniques of the server without having to renegotiate. Also, where selected, where a URI-compress header is present in a same message, a current compression may be terminated and a new compression technique may be requested (616).

Figure 7:
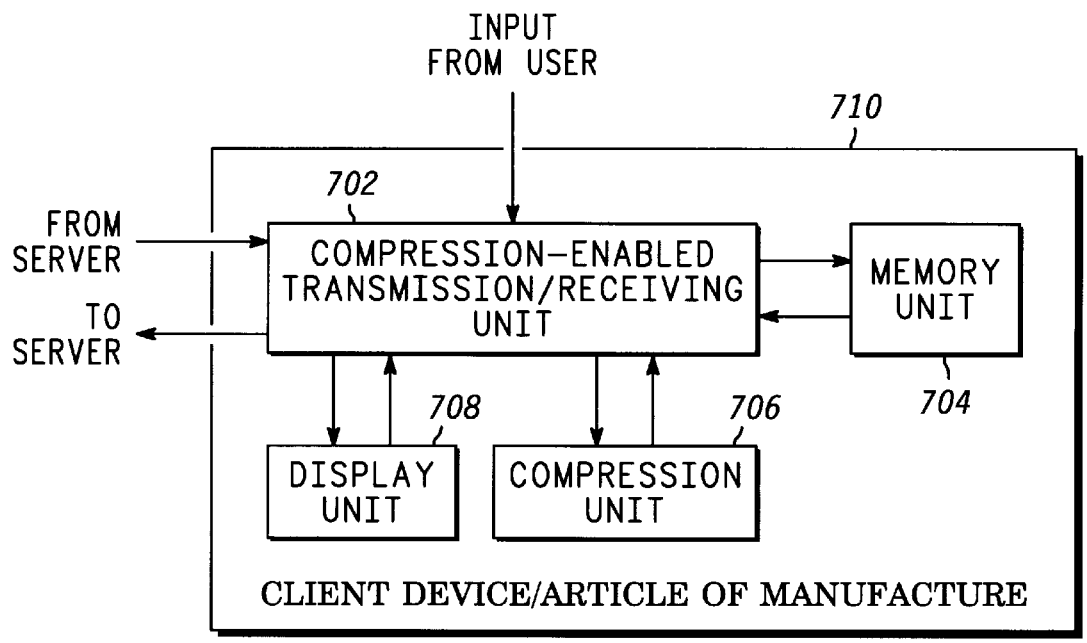
FIG. 7 is a block diagram of one embodiment of a client device/article of manufacture in accordance with the present invention.

FIG. 7, numeral 700, is a block diagram of a client device/article of manufacture for negotiating compression of universal resource identifiers in accordance with the present invention. The client device (710) includes: A) compression-enabled transmission/receiving unit (702), coupled to receive request for information and information requested from the server and coupled to the memory unit (704) and the compression unit (706), for sending a request to a server wherein the request includes a universal resource identifier URI and a list of compression techniques of the client, and for subsequently requesting, upon the server's determining an intersection of the list of client compression techniques and a list of server compression techniques and providing a response that includes the intersection and information requested by the client as identified by the URI, using a compressed URI and an indication of a compression technique used from the intersection; B) a memory unit (704), coupled to the compression-enabled transmission/receiving unit (702), for storing the list of client compression techniques, the intersection of the list of client compression techniques and a list of server compression techniques and predetermined information; C) a compression unit (706), coupled to the compression-enabled transmission/receiving unit (702), for applying a selected compression technique to an uncompressed URI; D) a display unit (708), coupled to receive information from the compression-enabled transmission/receiving unit, for displaying information identified by the URI and received from the server.

The article of manufacture typically includes a computer readable medium having computer readable program code thereon.

Typically, the client device is a cellular phone, a phone, a pager, a personal digital assistant or a computer.

Figure 8:
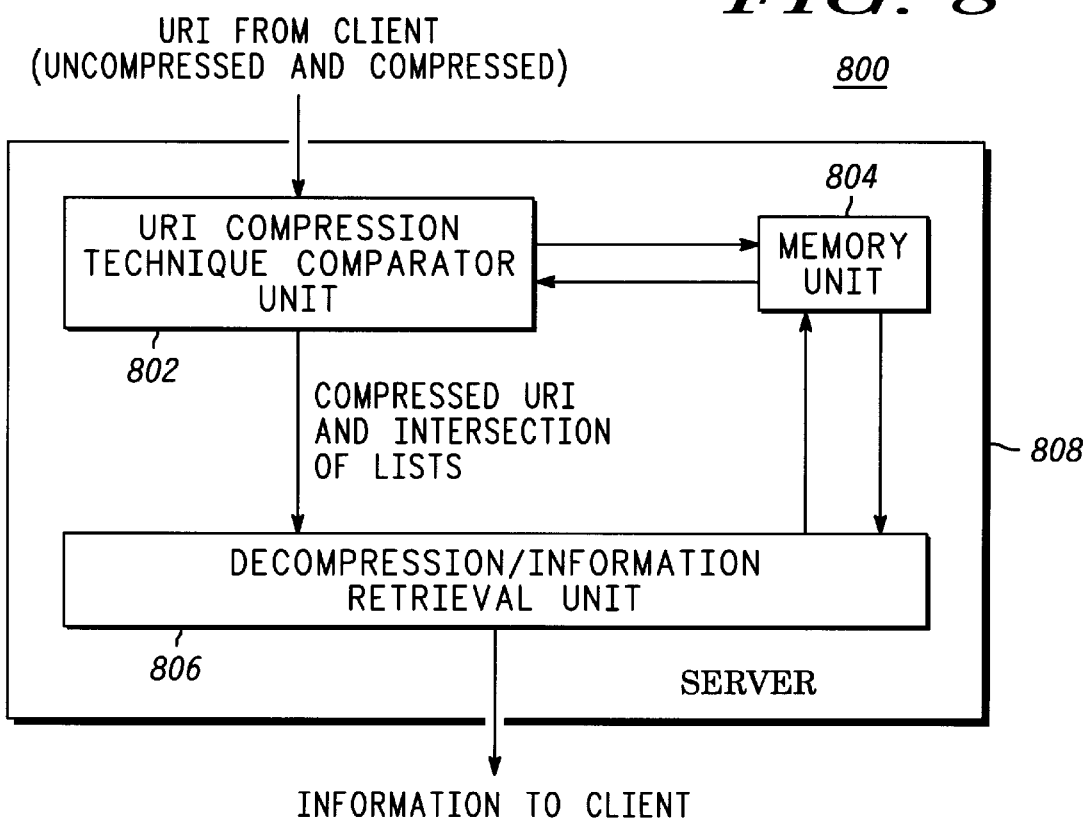
FIG. 8 is a block diagram of one embodiment of a server in accordance with the present invention.

FIG. 8, numeral 800, is a block diagram of a server for negotiating compression of universal resource identifiers in accordance with the present invention. The server (808) includes: A) a URI compression technique comparator unit (802), coupled to receive an uncompressed universal resource identifier URI from a client, for comparing a list of compression techniques from the client to a list of server compression techniques and determining an intersection; B) a memory unit (804), coupled to the URI compression technique comparator unit (802) and a decompression/information retrieval unit (806), for storing the list of server compression techniques and predetermined information; and C) the decompression/information retrieval unit (806), coupled to the memory unit (804) and to receive a compressed URI from the client, for decompressing the compressed URI, retrieving information identified by the compressed URI, and transmitting the information identified by the compressed URI to the client. The decompression/ information retrieval unit (806) may be further coupled to a plurality of servers.

The negotiation method has several other aspects:

In the event that the compression techniques available on the client and the server (or proxy) do not intersect, then the server (or proxy) would respond, for example, with URI-compress: 80 denoting the client should send all URIs uncompressed.

The client can poll for a list of the available compression techniques at the server (or proxy) by sending URI-compress: 80.

The uncompressed indicator is used to signal the server that the current URI is being sent uncompressed, but the client wishes to continue using the agreed upon compression. This uncompressed URI may act as a synchronization point for some compression techniques. For example, in a relative compression technique, an uncompressed URI may act as the new baseline for comparison.

A URI without a compression indicator is always uncompressed and designates the termination of any agreed upon compression technique.

If the URI-compress header is present in the same message, then the current compression is terminated, and a new technique is requested.

The client may cache the list of compression techniques available from a server (or proxy). The client may switch between techniques simply by providing the appropriate compression indicator in the compressed request-URI field. Some compression techniques may require an uncompressed URI to prime the compression process. In this case, the client must send an uncompressed URI before switching to the new compression technique, or the client and server (or proxy) must maintain separate state for each compression technique that requires it.

In the event that a server (or proxy) does not know what to do with the current compressed request-URI, it responds with a standard HTTP server error message.

As a further note for backward compatibility, if a client sends a URI-compress header and the server (or proxy) does not understand the header, the server (or proxy) will ignore the header and will not include a URI-compress header in its response.

If a server (or proxy) that does not understand compression receives a compressed URI (most significant bit in first byte of URI set to 1), then it responds with a standard HTTP client error message.

As shown in FIG. 9, numeral 900, the present invention may be implemented as a computer readable medium (902) for providing a scheme for negotiating compression of universal resource identifiers, the computer readable medium storing a plurality of executable program instructions (904), the plurality of executable program instructions (904) responsive, when executed, to: (A) send a request to a server wherein the request includes an uncompressed universal resource identifier URI and a list of compression techniques; (B) subsequently request, upon the server's determining an intersection of the list of compression techniques of the client and a list of compression techniques of the server and providing a response that includes the intersection and information requested by the client as identified by the URI, using a compressed URI and an indication of a compression technique used from the intersection; and (C) to display information requested as identified by the compressed URI and received from the server.

The compression technique may be changed by selecting from the intersection of the list of compression techniques of the client and the list of compression techniques of the server without having to renegotiate. The instruction "uncompressed" may be selectable to be sent at any time.

The client may request a server's entire compression list and determine a selected intersection of the list of compression techniques of the client and the list of compression techniques of the server.

A URI-compress header may be present in a same message such that a current compression is terminated and a new compression technique is requested.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for negotiating compression of universal resource identifiers, comprising the steps of:
   A) sending, by a client, a request to a server wherein the request includes an uncompressed universal resource identifier URI and a list of compression techniques of the client;
   B) determining, by the server, an intersection of the list of compression techniques of the client and a list of compression techniques of the server and providing a response to the client that includes the intersection of the compression techniques and information identified by the URI;
   C) subsequently requesting, by the client, information wherein one of:
      C1) a subsequent request includes a compressed URI and an indication of a compression technique used from the intersection based on a predetermined preferred list;
      C2) a subsequent request includes an uncompressed URI and an indication of an uncompressed technique used from the intersection;
      C3) a subsequent request includes an uncompressed URI without an indication of a compression technique from the intersection;
      C4) a subsequent request includes a compressed URI, an indication of a compression technique used from the intersection based on the predetermined preferred list and a list of compression techniques;
   D) decompressing, by the server, the compressed URI using the compression technique indicated in the subsequent request; and
   E) responding, by the server, wherein the response includes information requested as identified by the compressed URI.

2. The method of claim 1 further including the step of, where the intersection of the list of compression techniques is the null set, responding by the server with an indication to use an uncompressed mode.

3. The method of claim 1 further including, after step E, in a subsequent request to the server by the client, changing the compression technique by selecting from the intersection of the list of compression techniques of the client and the list of compression techniques of the server without having to renegotiate.

4. The method of claim 1 wherein where a URI-compress header is present in a same message, a current compression is terminated and a new compression technique is requested.

5. A method for negotiating compression of universal resource identifiers, comprising the steps of:
   A) receiving from a client, a request to a server wherein the request includes an uncompressed universal resource identifier URI;
   B) sending, by the server, a list of compression techniques;
   C) determining, by the client, a compression technique on a basis of an intersection of a list of compression techniques of the client and the list of compression techniques of the server;
   D) subsequently receiving from the client, information wherein one of:
      D1) a subsequent request includes a compressed URI and an indication of a compression technique used from the intersection of the list of compression techniques of the client and the list of compression techniques of the server based on a predetermined preferred list;
      D2) a subsequent request includes an uncompressed URI and an indication of an uncompressed technique used from the intersection;
      D3) a subsequent request includes an uncompressed URI without an indication of a compression technique from the intersection;
      D4) a subsequent request includes a compressed URI, an indication of a compression technique used from the intersection based on a predetermined preferred list and a list of compression techniques;
   E) decompressing, by the server, the compressed URI using the compression technique indicated in the subsequent request; and
   F) responding, by the server, wherein the response includes information requested as identified by the compressed URI.

6. The method of claim 5 further including, after step E, in a subsequent request to the server by the client, changing the compression technique by selecting from the intersection of the list of compression techniques of the client and the list of compression techniques of the server without having to renegotiate.

7. The method of claim 5 wherein where a URI-compress header is present in a same message, a current compression is terminated and a new compression technique is requested.

8. A client device for negotiating compression of universal resource identifiers, comprising:
   A) compression-enabled transmission/receiving unit, coupled to receive request for information and information requested from the server and coupled to the memory unit and the compression unit, for sending a request to a server wherein the request includes a universal resource identifier URI and a list of compression techniques of the client, and for subsequently requesting, upon the server's determining an intersection of the list of client compression techniques and a list of server compression techniques and providing a response that includes the intersection and information requested by the client as identified by the URI, using a compressed URI and an indication of a compression technique used from the intersection;
   B) a memory unit, coupled to the compression-enabled transmission/receiving unit, for storing the list of client compression techniques, the intersection of the list of client compression techniques and a list of server compression techniques and predetermined information;
   C) a compression unit, coupled to the compression-enabled transmission/receiving unit, for applying a selected compression technique to an uncompressed URI;
   D) display means, coupled to receive information from the compression-enabled transmission/receiving unit, for displaying information identified by the URI and received from the server.

9. The client device of claim 8, wherein the client device is one of:
A) a cellular phone;
B) a phone;
C) a pager;
D) a personal digital assistant; and
E) a computer.

10. A server for negotiating compression of universal resource identifiers, comprising:
   A) a comparator unit, coupled to receive an uncompressed universal resource identifier URI and a list of compression techniques from a client, for comparing the list of compression techniques from the client to a list of server compression techniques and determining an intersection;
   B) a memory unit, coupled to the comparator and a decompression/information retrieval unit, for storing the list of server compression techniques and predetermined information;
   C) the decompression/information retrieval unit, coupled to the memory unit and to receive a compressed URI from the client, for decompressing the compressed URI, retrieving information identified by the compressed URI, and transmitting the information identified by the compressed URI to the client.

11. The server of claim 10, wherein the decompression/information retrieval unit is further coupled to a plurality of servers.

12. An article of manufacture for providing a scheme for negotiating compression of universal resource identifiers, comprising a computer usable medium having computer readable program code means thereon comprising:
   A) compression-enabled transmission/receiving means for sending a request to a server wherein the request includes an uncompressed universal resource identifier URI and a list of compression techniques;
   B) compression-enabled requesting means, coupled to the compression-enabled transmission/receiving means, for subsequently requesting, upon the server's determining an intersection of the list of compression techniques of the client and a list of compression techniques of the server and providing a response that includes the intersection and information requested by the client as identified by the URI, using a compressed URI and an indication of a compression technique used from the intersection;
   C) display means, coupled to receive information from the server, for displaying information requested as identified by the compressed URI and received from the server.

13. A computer readable medium for providing a scheme for negotiating compression of universal resource identifiers, the computer readable medium storing a plurality of executable program instructions, the plurality of executable program instructions responsive, when executed, to: A) send a request to a server wherein the request includes a universal resource identifier URI and a list of compression techniques of the client, and for subsequently requesting, upon the server's determining an intersection of the list of client compression techniques and a list of server compression techniques and providing a response that includes the intersection and information requested by the client as identified by the URI, using a compressed URI and an indication of a compression technique used from the intersection; B) store the list of client compression techniques, the intersection of the list of client compression techniques and a list of server compression techniques and predetermined information; C) apply a selected compression technique to an uncompressed URI; D) display information identified by the URI and received from the server.

14. The computer readable medium of claim 13 wherein the compression technique is changed by selecting from the intersection of the list of compression techniques of the client and the list of compression techniques of the server without having to renegotiate.

15. The computer readable medium of claim 13 wherein the selected compression technique is an uncompressed technique.

16. The computer readable medium of claim 13 wherein the client requests server's entire compression list and determines a selected intersection of the list of compression techniques of the client and the list of compression techniques of the server.

17. The computer readable medium of claim 13 wherein where a URI-compress header is present in a same message, a current compression is terminated and a new compression technique is requested.

* * * * *